3,354,182
ANTHRAQUINONE DYESTUFFS
Rudolf Kühne and Fritz Meininger, Frankfurt am Main, Germany, and Rolf Pfirrmann, Lucerne, Switzerland, assignors to Farbwerke Hoechst Aktiengesellschaft vormals Meister Lucius & Brüning, Frankfurt am Main, Germany, a corporation of Germany
No Drawing. Filed Oct. 2, 1963, Ser. No. 313,181
Claims priority, application Germany, Oct. 3, 1962, F 37,949
5 Claims. (Cl. 260—374)

ABSTRACT OF THE DISCLOSURE 1-amino - 4 - phenylamino anthraquinone dyestuffs in which the pendant phenyl group is substituted by an amino- or quaternary amino-ethylene sulfonamido group.

The present invention relates to novel organic dyestuffs and to a process for preparing them; especially it relates to organic dyestuffs of the general formulae

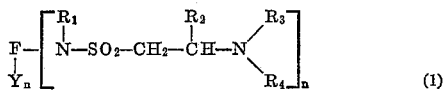
(1)

and

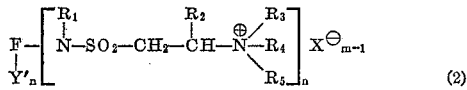
(2)

in which F represents the radical of an organic dyestuff molecule of the nitro, anthraquinone or phthalocyanine series, $R_1$, $R_2$ represent hydrogen atoms or lower alkyl groups, $R_3$, $R_4$ and $R_5$ represent hydrogen atoms, aliphatic, cycloaliphatic, aromatic or heterocyclic radicals, two or three of these radicals together with the nitrogen atom may belong to a heterocyclic ring, $X^\ominus$ represents an inorganic or organic acid radical, Y represents a hydrogen atom or the group —$SO_3H$ or —COOH, Y' represents a hydrogen atom or the group —$SO_3^\ominus$ or —$COO^\ominus$, $n$ means an integer from 1 to 3 and $m$ means an integer from 1 to 4, with the proviso that $m$ stands for an integer from 2 to 4, when Y' represents a hydrogen atom and $n$ stands for 1, when Y' represents the group —$SO_3^\ominus$ or —$COO^\ominus$.

It has been found that novel organic dyestuffs of the general formulae

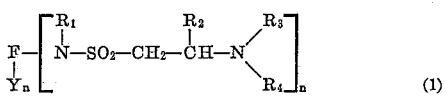
(1)

and

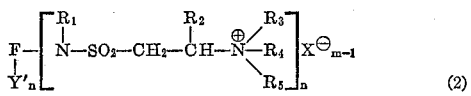
(2)

in which F represents the radical of an organic dyestuff molecule of the azo, nitro, anthraquinone or phthalocyanine series, $R_1$, $R_2$ represent hydrogen atoms or lower alkyl groups, $R_3$, $R_4$ and $R_5$ represent hydrogen atoms, aliphatic, cycloaliphatic, aromatic or heterocyclic radicals, two or three of these radicals together with the nitrogen atom may belong to a heterocyclic ring, $X^\ominus$ represents an inorganic or organic acid radical, Y represents a hydrogen atom or the group —$SO_3H$ or —COOH, Y' represents a hydrogen atom or the group —$SO_3^\ominus$ or —$COO^\ominus$, $n$ means an integer from 1 to 3 and $m$ means an integer from 1 to 4, with the proviso that $m$ stands for an integer from 2 to 4, when Y' represents a hydrogen atom and $n$ stands for 1, when Y' represents the group —$SO_3^\ominus$ or —$COO^\ominus$ can be prepared by reacting in an aqueous solution or suspension.

(a) Organic dyestuffs of the general formulae

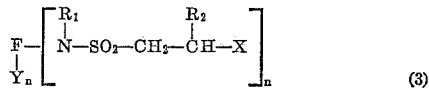
(3)

or

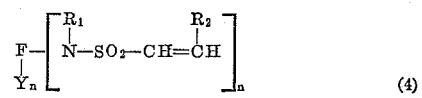
(4)

in which F, $R_1$, $R_2$, X and $n$ are defined as above, with ammonia, primary or secondary aliphatic, cycloaliphatic, aromatic or heterocyclic amines and treating the amines thus obtained in known manner, if desired, with alkylating agents or inorganic or organic acids or (b) Dyestuffs of the general Formula 3 with tertiary aliphatic, cycloaliphatic, aromatic or heterocyclic amines.

As starting dyestuffs of the general Formulae 3 and 4 there may be used dyestuffs of any class, which in addition to at least one group of the formula

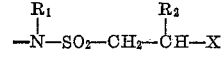

or

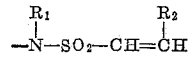

may contain groups imparting solubility in water as, for example, sulfonic acid amide, carboxylic acid and, above all, sulfonic acid groups.

The azo-dyestuffs used as starting material can be prepared, for example, by coupling aromatic diazo, diazoazo, or tetrazo compounds with coupling components, both components possibly carrying groups imparting solubility in water and at least one of the two components containing one or several ethionylamino groups which may be bound to the dyestuff molecule either directly or over an aliphatic bridge member and correspond to the general formula

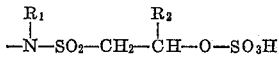

in which $R_1$ and $R_2$ are groups having the above-mentioned meanings. Azo-dyestuffs of the same constitution are obtained by reacting azo-dyestuffs containing acylatable amino groups with carbyl sulfate.

Azo-dyestuffs containing at least one group of the formula

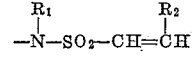

can be obtained, for example, by treating azo-dyestuffs or the dyestuff components from which the dyestuff is prepared by diazotizing and coupling and which contain at least one group of the formula

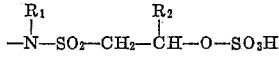

with agents having an alkaline reaction.

In the process of the present invention there may also be used the azo-dyestuffs mentioned above in the form of their metal complexes. These starting compounds can be prepared by treating azo-dyestuffs of the above-indicated constitution, which contain in addition one group capable of forming metal complexes, with metal-yielding agents.

The dyestuffs used as starting compound in the process of the present invention and having the above Formula 3 which in addition to the azo-dyestuff series may belong especially to the above-mentioned dyestuff series as, for example, the nitro, anthraquinone or phthalocyanine series, can also be prepared by condensing dyestuffs containing one or several halogen atoms capable of reacting and, if desired, groups imparting solubility in water with N-ethionylamino arylamines or N-isoethionylamino arylamines and esterifying the hydroxy groups of the β-hydroxy-alkyl-sulfonic acid radicals in the dyestuffs containing iso-ethionylamino groups with an acid. The starting compounds of the Formula 3 in which X represents a halogen atom and especially a chlorine atom, can be prepared by reacting corresponding β-hydroxyethyl-sulfonyl-amino groups-containing dyestuffs with halogen-yielding agents as, for example, thionyl chloride. Further suitable starting compounds are dyestuffs containing β-hydroxyethylsulfonylamino groups esterified with phosphoric acid or organic acids. There may also be used dyestuffs containing, for example, one β-aceto-hydroxy-ethane-sulfonyl-N-alkylamino group.

Primary or secondary amines suitable for the reaction with compounds of the general Formula 3 or 4 are, for example, ammonia, hydrazine, methylamine, dimethylamine, diethylamine, diethanolamine, morpholine, propylamine, isopropylamine, butylamine, hexylamine, piperidine, benylamine, pyrrolidine, aniline and nitraniline.

The reaction of compounds of the general Formulae 3 and 4 with ammonia, primary or secondary amines can be carried out within a large temperature range, namely at about 20° to 150° C. On one hand, however, the optimum temperature to be used in each individual case depends to a large extent upon the compound of the Formulae 3 and 4 used, the reaction conditions being particularly influenced by the substituents $R_1$ and the acid radical X, and on the other hand upon the amine used. Thus, when using aliphatic or cyclic bases, the most favorable temperature range is often between about 40° and 80° C., whereas, when reacting heterocyclic or aromatic amines, it is sometimes advantageous to use higher temperatures, for example, from about 70° to 80° C. When using higher temperatures, it is in some cases advantageous—with regard to the volatility of the compounds used—to operate with an autoclave. The reaction of compounds of the general Formulae 3 and 4 with the amines mentioned can be carried out in an aqueous solution or an aqueous suspension, in the last case, if desired, with the addition of a dispersing agent, while stirring and kneading, in order to obtain a homogeneity of the reaction mixture favorable for the reaction. The reaction components can also be reacted in other indifferent solvents as, for example, dioxane, tetrahydrofurane, dimethylformamide or benzene.

As a rule it is advantageous to react the compound of the general Formula 3 or 4 with the amine at a molar ratio of 1:1. In many cases, for example, when reacting said compounds with primary or secondary amines, it is, however, advantageous to operate with an excess of amine.

The dyestuffs of the general Formula 1 obtained as described above by reacting compounds of the general Formula 3 or 4 with the primary or secondary amines mentioned above may be used for dyeing per se or, if desired, reacted in known manner either with alkylating agents, for example, alkyl halides such as methyl iodide, or dialkyl sulfates such as dimethyl sulfate, or with p-toluenesulfonic acid alkyl-esters, or with inorganic acids as, for example, hydrochloric acid, hydrobromic acid or sulfuric acid, or organic acids as, for example, formic acid, to form the corresponding ammonium compounds of the general Formula 2. For this purpose the dyestuffs of the general Formula 1 are allowed to react in an aqueous suspension or solution or dissolved in a sufficiently indifferent solvent as, for example, benzene, acetic acid ethylester, with the alkylating agent or the acid at temperatures ranging between about 10° and 100° C., preferably between about 20° and 40° C.

When reacting dyestuffs of the general Formula 3 with tertiary aliphatic, aromatic or heterocyclic amines as, for example, trimethylamine or pyridine, there are obtained directly ammonium compounds of the general Formula 2. The reaction conditions are the same as those of the reaction with primary or secondary amines described above.

In the process of the present invention the dyestuffs of the general Formula 1 can be obtained with good yields. The transformation of these dyestuffs of the general Formula 1 into the corresponding ammonium compounds of the general Formula 2 is carried out with a yield of 90 to 100% of the theory.

The novel dyestuffs obtainable by the process of the present invention may be used for dyeing natural and synthetic textile materials as, for example, of cotton, viscose, regenerated cellulose, wool, silk, fibers of cellulose acetate, polyamide, polyacrylonitrile and aromatic polyesters. There are obtained fast intense dyeings which are distinguished, above all, by a very good fastness to wet processing.

For dyeing textile materials of cellulose fibers there are thus particularly suitable dyestuffs obtainable by the process of the present invention which contain groups imparting solubility in water, especially sulfonic acid or carboxylic acid groups. The water-soluble dyestuffs are applied to the cellulose fibers by treating the material with an aqueous solution of the dyestuff at normal or elevated temperature in the presence of an acid-binding agent such as sodium carbonate, sodium bicarbonate, trisodium phosphate or trichloroacetic sodium, or with a printing paste with the addition of an acid-binding agent, the treatment with the acid-binding agent being carried out before, during or after the application of the dyestuff, and by then heating or steaming it.

For dyeing textile materials containing cellulose there are also especially suitable the dyestuffs obtainable according to the process of the present invention which do not contain any further groups imparting solubility in water such as sulfonic acid or carboxylic acid groups. Such dyestuffs are applied to the fiber according to the usual dyeing, padding and printing processes and, if desired, after-treated with an acid-binding agent at room or elevated temperature. Such cationic dyestuffs are also suitable for dyeing wool and particularly suitable for dyeing synthetic fibers as, for example, of acetate rayon, polyamides, polyesters and polyacryl-nitrile.

The dyestuffs of the Formulae 3 and 4 used as starting material in the present process are superior to the dyestuffs obtained by the process of the present invention regarding their affinity to the fiber. Owing to their cationic properties they have the advantage of migrating only to a small extent, when drying the dyed material, thus evener dyeings into which the dyestuff has better penetrated being obtained. Finally, the dyestuffs free from anionic groups may be used in the form of fast solutions due to their solubility in water, whereas, for example, the dyestuffs applied for dyeing acetate silk have to be used in an aqueous suspension.

The following examples serve to illustrate the invention, but they are not intended to limit it thereto, the parts and percentages being by weight unless otherwise stated and the relationship of parts by weight to parts by volume being the same as that of the kilogram to the liter.

Example 1

1460 parts of the azo-dyestuff of the formula

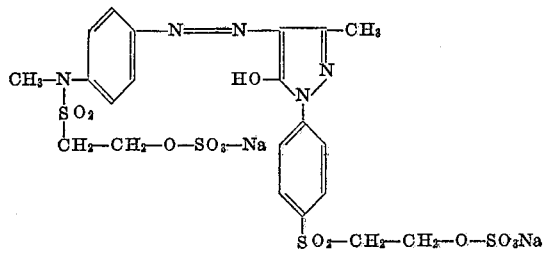

having a net content of about 50% and obtainable by coupling 1 mol of diazotizable 4-amino-N-ethionyl-N-methyl-aminobenzene with 1 mol of the sodium salt of the sulfuric acid ester of 1-phenyl-3-methyl-pyrazolone-(5)-4'-β-hydroxy-ethylsulfone, are dissolved in water at about 40° C. and stirred for 3 hours at this temperature together with 330 parts of an aqueous dimethylamine solution of 40% strength. The dyestuff is then precipitated by cooling and salting out with sodium chloride. After filtering off and drying there are obtained 1190 parts of a yellow-brown dyestuffs of the formula

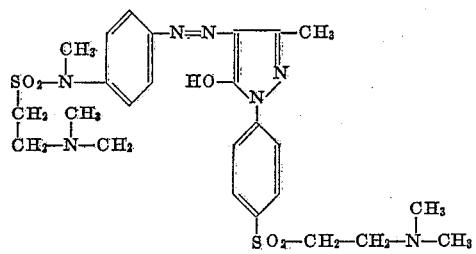

which dissolves in dilute acids to give a yellow solution.

On cotton yellow dyeings and prints having a good to very good fastness to wet processing are obtained with this dyestuff.

A dyestuff having similar properties is obtained when using in Example 1 a dyestuff of the formula

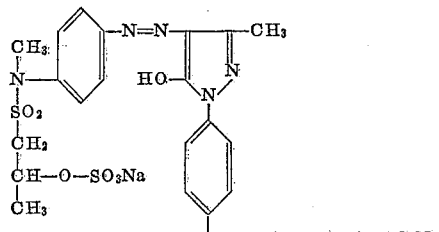

as starting compound.

Example 2

600 parts of the dyestuff obtained in Example 1 are dissolved in 800 parts by volume of methylene chloride while heating, organic salts are then filtered off and 150 parts of dimethyl sulfate are slowly added dropwise at room temperature. After a short time the yellow quaternary dyestuff ammonium compounds precipitates. After filtering off and drying in vacuo there are obtained 468 parts of a dyestuff having the formula

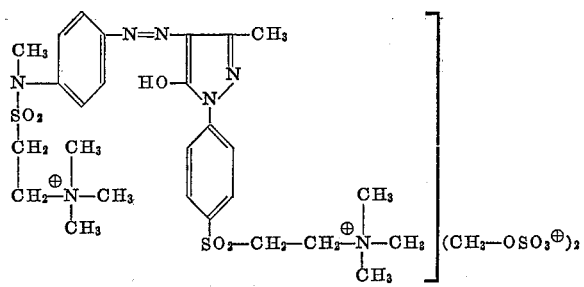

and a net content of about 90%, which is superior to the dyestuff obtained in Example 1 in respect of its solubility in water.

According to the pad-steaming process there are obtained on cotton yellow dyeings and according to the printing process with the use of an alkali-yielding agent yellow prints having a good to very good fastness to wet processing.

Example 3

17 parts of piperidine are slowly added dropwise at about 60° to 70° C., while continuously stirring, to a solution of 62 parts of the dyestuff of the formula

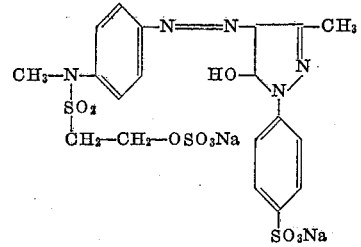

in 200 parts of water. After the addition of the pyridine the mixture is stirred for 3 hours at this temperature. The dyestuff of the formula

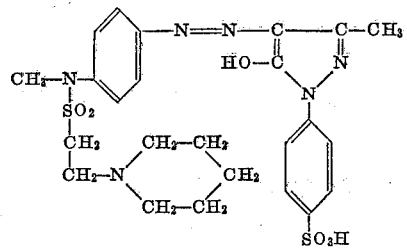

is then separated by cooling and salting out with sodium chloride.

On cotton yellow dyeings or prints having good fastness properties are obtained with this dyestuff.

When using instead of piperidine an equivalent amount of cyclohexylamine, a dyestuff of similarly good fastness properties and similar shade is obtained.

The dyestuffs obtained can then be quaternized with dimethyl sulfate as described in Example 2. As quaternizing agents there may also be used diethyl sulfate, methyl or ethyl iodide, thus correspondingly substituted dyestuff ammonium compounds being obtained.

Example 4

54 parts of the dyestuff of the formula

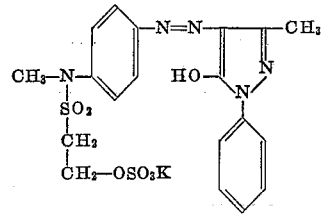

obtainable by coupling diazotizable 4-amino-N-ethionyl-N-methylaminobenzene with 1-phenyl-3-methyl-pyrazolone-5 are stirred for 2 hours at 60° C. in 250 parts of water together with 33 parts of an aqueous dimethylamine solution of 40% strength. When cooling the dyestuff of the formula

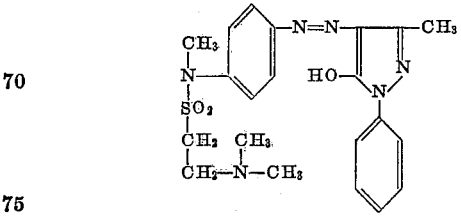

precipitates. After filtering off and drying in vacuo 39 parts of a yellow powder are obtained which dyes polyester fibers golden yellow shades according to the high temperature process.

22 parts of the dyestuff are dissolved in 500 parts of benzene while stirring and boiling under reflux; then 19 parts of dimethyl sulfate are added dropwise at this temperature. The dyestuff containing one quaternary ammonium group separates at once. After filtering off, washing with benzene and drying in vacuo 23 parts of a yellow dyestuff of the formula

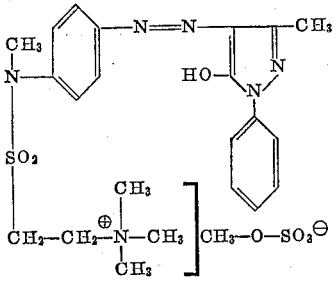

are obtained which dissolves in water to give a yellow solution and dyes polyamide fibers and polyacrylo-nitrile fibers golden yellow shades.

By adding an alkali-yielding agent and then steaming there are obtained on cotton golden yellow prints having a good to very good fastness to wet processing.

*Example 5*

42 parts of the dyestuff of the formula

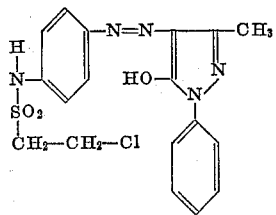

obtainable by coupling diazotizable 4-amino-β-chloro-ethylsulfonyl-aminobenzene with 1-phenyl-3-methyl-pyrazolone-5, are stirred for 3 hours at room temperature together with 500 parts of water and 54 parts of an aqueous trimethylamine solution of 33% strength. The whole is then neutralized with 2 N-hydrochloric acid, cooled to about 0° C., the precipitated dyestuff is filtered off and dried in vacuo.

The dyestuff obtained has the formula

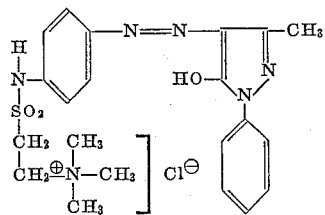

and is a yellow powder which dissolves in water to give a yellow solution and dyes polyester fibers yellow shades according to the high temperature process, thus dyeings of good fastness properties, especially a good fastness to thermofixation, being obtained.

*Example 6*

61 parts of the dyestuff of the formula

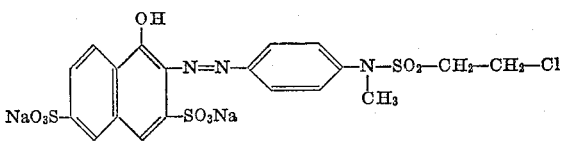

obtainable by coupling diazotizable 4-amino-β-chloro-ethylsulfonyl - aminobenzene with 1-naphthol-3,6-disulfonic acid are heated under reflux for 3 hours together with 200 parts of water and 16 parts of pyridine. The dyestuff ammonium compound is then separated by cooling and salting out with sodium chloride. After filtering off and drying there is obtained a dyestuff of the formula

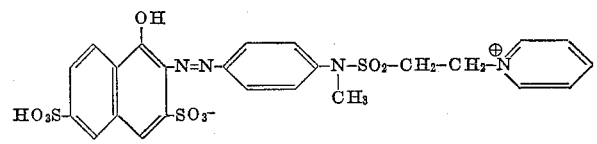

in the form of a dark powder which yields on cotton in the presence of an acid-binding agent a brilliant scarlet print having a good fastness to light and to wet processing.

The following table contains a number of further azo-dyestuffs obtainable according to the process of the present invention and the tints of the dyeings or prints obtainable with these dyestuffs on cellulose fibers in the presence of an acid-binding agent. Depending on the pH-value of the solutions from which they are separated, the dyestuffs may have either betaine-form or the form of mineral acid salts.

| Example | Dyestuff | Tint on cotton |
|---|---|---|
| 7 | ![structure] | Red. |
| 8 | ![structure] | Yellow. |

| Example | Dyestuff | Tint on cotton |
|---|---|---|
| 9 | 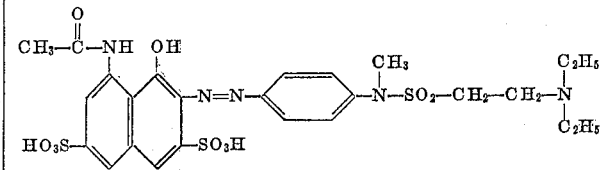 | Bluish red. |
| 10 | 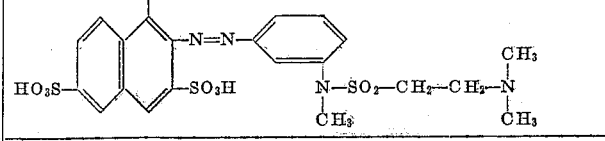 | Scarlet. |
| 11 | 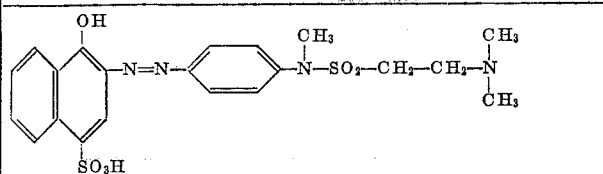 | Scarlet. |
| 12 | 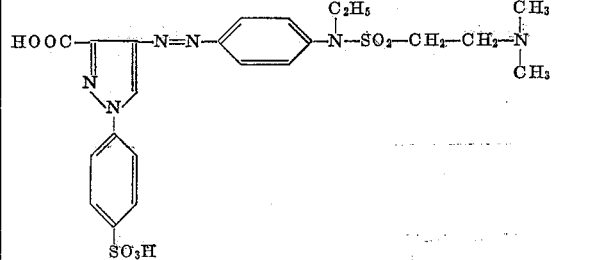 | Yellow. |
| 13 | 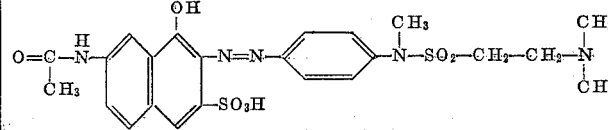 | Scarlet. |
| 14 | 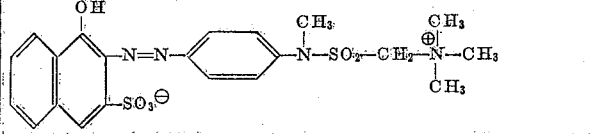 | Orange. |
| 15 | 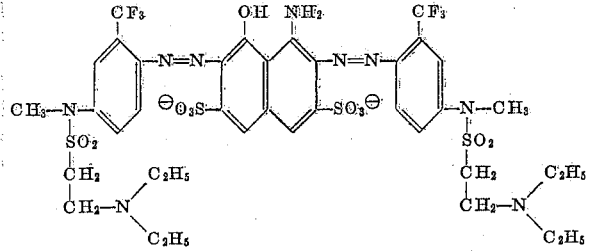 | Black. |
| 16 | 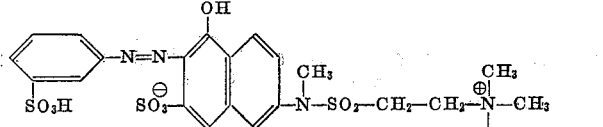 | Orange. |
| 17 | 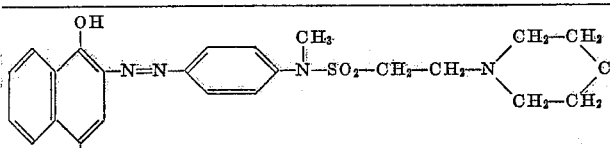 | Scarlet. |

| Example | Dyestuff | Tint on cotton |
|---------|----------|----------------|
| 18 | 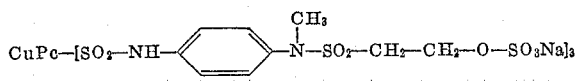 | Violet. |
| 19 | | Yellow. |
| 20 | | Scarlet. |
| 21 | | Bluish red. |

*Example 22*

176 parts of the copper-phthalocyanine dyestuff of the formula

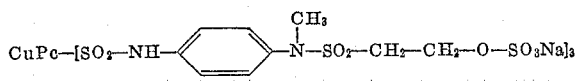

CuPc—[SO₂—NH—⟨⟩—N(CH₃)—SO₂—CH₂—CH₂—O—SO₃Na]₃ are stirred for 2 hours at about 60° C. together with 33 parts of an aqueous dimethylamine solution of 40% strength. The mixture is then cooled to about 0° C. The separated dyestuff is filtered off and dried in vacuo; there are obtained 140 parts of a greenish blue powder which when adding acetic acid dissolves in water to give a blue solution and dyes cotton in an acetic bath and after the fixation by an alkaline treatment turquoise shades; the dyeings possess a good fastness to washing and to soaping.

The dystuff obtained has the formula

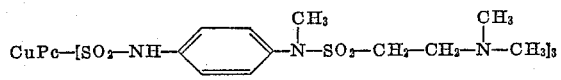

15 parts of this dyestuff are dissolved in 100 parts of dimethyl formamide while heating. After having cooled the solution 76 parts of dimethyl sulfate are slowly added dropwise, while stirring. After stirring for 3 hours 400 parts of alcohol are added. The separated dyestuff is filtered off and dried in vacuo. It has the formula

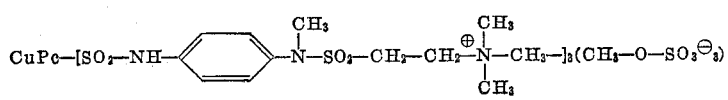

16 parts of a greenish blue powder are obtained which dissolves in water to give a blue-green solution and dyes cotton turquoise-blue shades according to the pad-steaming process.

The starting compound used for preparing this dyestuff can be produced, for example in the following manner:

44 parts of copper-phthalocyanine trisulfochloride are introduced slowly at about 15° C. to 20° C., while stirring, into a solution of 104 parts of 4-amino-N-β-hydroxy-ethyl-sulfonyl-N-methyl-aminobenzene in 80 parts of dimethyl formamide and 46 parts of methanol. The whole is then after-stirred for 24 hours and the separated dyestuff is filtered off. The dyestuff is then washed with 2000 parts of hot water and dried in vacuo. 73 parts of the dyestuff of the formula

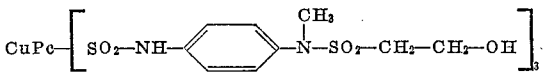

are obtained.

This dyestuff can be esterified in simple manner by introduction into sulfuric acid at about 0° to 5° C.

Example 23

57 parts of the anthraquinone-dyestuff of the formula

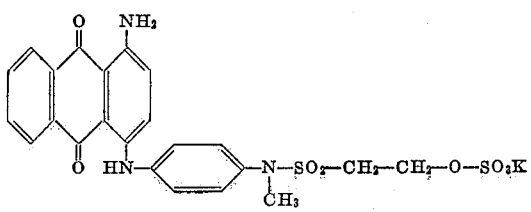

are suspended in 200 parts of water and the suspension is stirred for 2 hours at about 40° C. together with 33 parts of an aqueous dimethylamine solution of 40% strength. The reaction solution is subsequently cooled to 0° C. and the separated dyestuff is filtered off. The dyestuff is dissolved in 300 parts of acetone, the solution is filtered over animal charcoal and the filtrate is evaporated in vacuo to dryness. 43 parts of the dyestuff of the formula

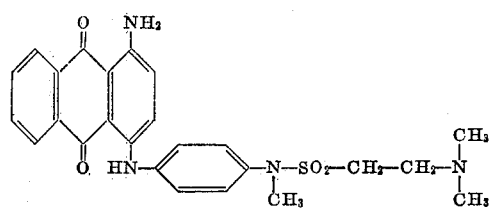

are obtained.

The dyestuff is then dissolved at room temperature in 250 parts of benzene and 48 parts of dimethyl sulfate are added dropwise while stirring. After a short time the dyestuff containing one quaternary ammonium group separates. The whole is after-stirred for another 2 hours, then the precipitated dyestuff is filtered off, washed with a small amount of benzene and dried in vacuo at about 40° C. 50 parts of a dark blue powder are obtained which dyes synthetic polyamide fibers and polyacrylo-nitrile fibers blue shades. Polyester fibers may be dyed in blue shades according to the high temperature process. The dyeings obtained possess a good fastness to washing, to rubbing and to thermofixation.

Example 24

59 parts of the nitro-dyestuff of the formula

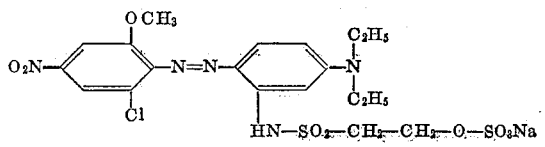

are stirred for 2 hours at about 60° C. in 200 parts of water and 33 parts of an aqueous dimethylamine solution of 40% strength. The whole is then cooled to about 0° C. and the precipitated dyestuff of the formula

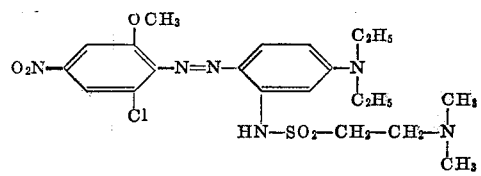

is filtered off. After drying in vacuo a dark-colored powder is obtained which dissolved in benzene to give a red solution. 38 parts of dimethyl sulfate are added dropwise at room temperature to the benzene solution. The dyestuff containing one quaternary ammonium group is filtered off and washed with benzene. Polyester fibers may be dyed with this dyestuff in bluish-red shades according to the high temperature process.

Example 25

83 parts of the dyestuff of the formula

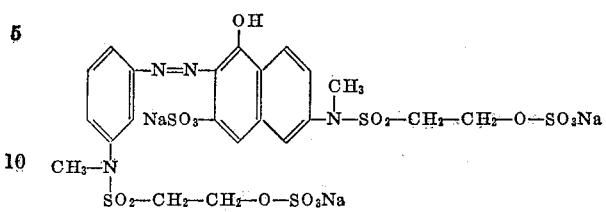

are stirred for 3 hours at about 50° C. together with 250 parts of water and 60 parts of a dimethylamine solution of 40% strength. Subsequently the solution is cooled to 0° C. and sodium chloride is added; then the dyestuff is filtered off and dried in vacuo. The dyestuff obtained has the formula

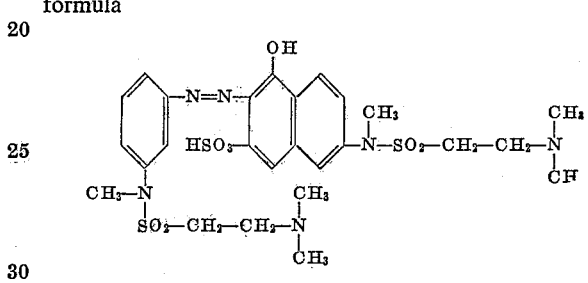

With this dyestuff there is obtained on cotton in the presence of acid-binding agents an orange print possessing a good to very good fastness to wet processing.

Example 26

54 parts of the dyestuff of the formula

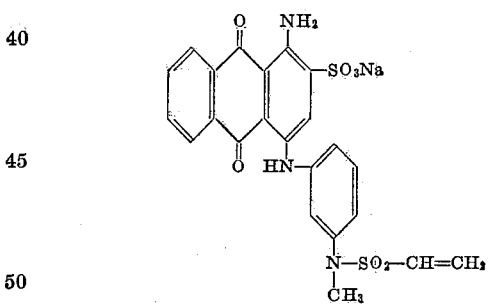

are stirred for 3 hours at about 50° to 60° C. together with 200 parts of water and 30 parts of a diethylamine solution of 40% strength. Subsequently the solution is cooled to 0° C. and sodium chloride is added; the separated dyestuff is then filtered off and dried in vacuo. The dyestuff obtained has the formula

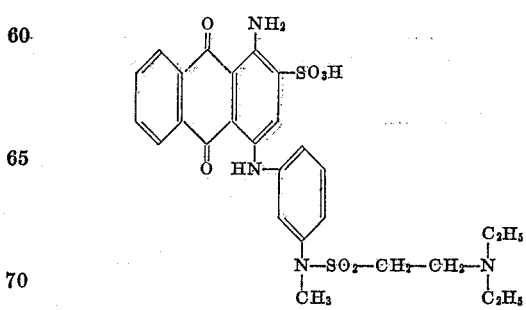

This dyestuff yields on cotton in the presence of agents having an alkaline reaction a clear blue print possessing a good to very good fastness to wet processing.

When using in the above example as starting compound the dyestuff of the formula

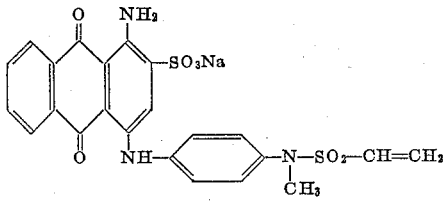

the dyestuff of the formula

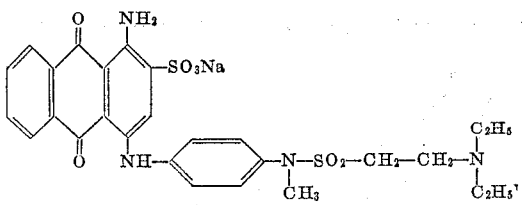

is obtained having a similar tint and the same fastness properties.

In an analogous manner there are obtained the following azo-dyestuffs indicated in the table below:

| Ex. | Dyestuff | Bluish red. |
|---|---|---|
| 27 | (structure with $CH_3-CO-NH$, $OH$, $HO_3S$, $SO_3H$, $-N=N-$, phenyl, $N-SO_2-CH_2-CH_2-N$ with $CH_3$ groups) | Bluish red. |
| 28 | (structure with $Cl-CH_2-CO-NH$, $OH$, $HO_3S$, $SO_3^{\ominus}$, $-N=N-$, phenyl, $N-SO_2-CH_2-CH_2-\overset{\oplus}{N}$ with $CH_3$ groups) | Bluish red. |
| 29 | (naphthol structure with $OH$, $SO_3^{\ominus}$, $-N=N-$ phenyl, $N-SO_2-CH_2-CH_2-\overset{\oplus}{N}$ with $CH_3$ groups) | Red. |
| 30 | (naphthol structure with $OH$, $SO_3H$, $SO_3^{\ominus}$, $-N=N-$, phenyl with $N-CH_3$ and $SO_2-CH_2-CH_2-\overset{\oplus}{N}(CH_3)_3$) | Orange. |
| 31 | (structure with phenyl-$CO-NH$, $SO_3H$, $SO_3H$, $-N=N-$, phenyl, $N-SO_2-CH_2-CH_2-N$ with $C_2H_5$, $C_2H_5$ and $CH_2CH_2CH_2CH_3$) | Red. |
| 32 | ($HOOC$ pyrazole with $OH$, phenyl-$SO_3^{\ominus}$, $-N=N-$ phenyl, $N-SO_2-CH_2-CH_2-\overset{\oplus}{N}$ with $CH_3$ groups) | Greenish yellow. |
| 33 | (naphthol with $OH$, $SO_3H$, $HN$, $H_2N-CO$, $-N=N-$ phenyl, $N-SO_2-CH_2-CH_2-N$ with $CH_3$ groups) | Orange. |

| Ex. | Dyestuff | Bluish red. |
|---|---|---|
| 34 | (structure with naphthalene-OH, CH₃-HN, -SO₃H, -N=N-phenyl-N(CH₃)-SO₂-CH₂-CH₂-N(CH₃)₂) | Brown. |
| 35 | (structure with naphthalene-OH, phenyl-NH with COOH, -SO₃H, -N=N-phenyl-N(CH₃)-SO₂-CH₂-CH₂-N(CH₃)₂) | Orange. |
| 36 | (naphthalene-OH, SO₃⁻, -N=N-phenyl-N(CH₃)-SO₂-CH₂-CH₂-N⁺(piperidine with CH₃)) | Reddish orange |
| 37 | HOOC-pyrazole(-OH, N-phenyl-SO₃H)-N=N-phenyl-N(CH₃)-SO₂-CH₂-CH₂-phenyl | Greenish yellow. |
| 38 | CuPc—(SO₂—NH—phenyl—N(CH₃)—SO₂—CH₂—CH₂—N⁺(CH₃)₃)₄ (CH₃—O—SO₃⁻)₄ | Turquoise blue. |
| 39 | CuPc—(SO₂—NH—phenyl—N(C₂H₅)—SO₂—CH₂—CH₂—N⁺(CH₃)₂H)₄ 2SO₄⁻ | Turquoise blue. |
| 40 | CuPc—(SO₂—NH—phenyl—N(CH₃)—SO₂—CH₂—CH₂—N⁺(CH₃)₂H)₄ 4Cl⁻ | Turquoise blue. |
| 41 | (anthraquinone with NH₂ and NH-phenyl-N(CH₃)-SO₂-CH₂-CH₂-N⁺(CH₃)₂(C₂H₅) C₂H₅—O—SO₃⁻) | Blue. |

We claim:
1. A compound of the formula

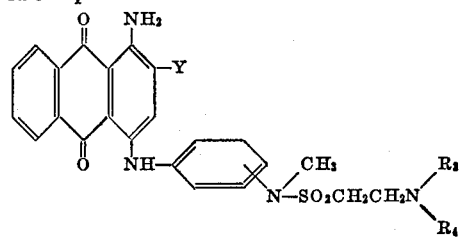

or

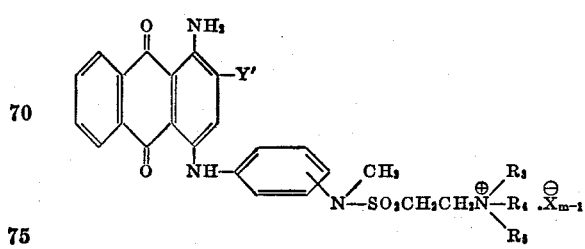

wherein $R_3$, $R_4$ and $R_5$ are hydrogen, lower alkyl or phenyl, $R_3$ and $R_4$ together represent lower alkylene, $R_3$, $R_4$ and $R_5$ together with the nitrogen atom represent a pyridinium group, X is a chlorine anion, $-HSO_4$, $SO_{4/2}$, $C_2H_5-O-SO_3$ or $CH_3-O-SO_3$, Y is hydrogen or $-SO_3H$, Y' is hydrogen or $-SO_3^\ominus$, and $m$ is 1 or 2, being 1 when Y' is $-SO_3^\ominus$ the sulfonamido substituent being in the meta or para position on the pendant aryl moiety.

2. A compound of the formula

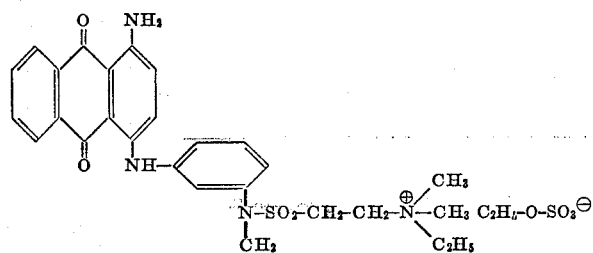

3. The compound of the formula

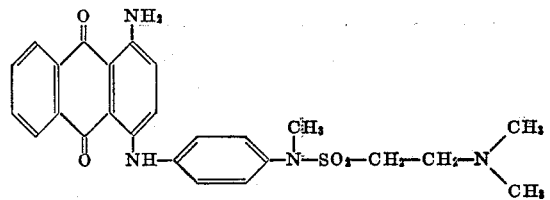

4. The compound of the formula

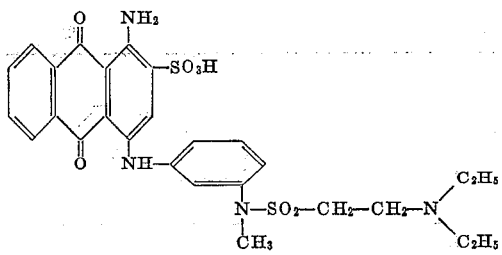

5. The compound of the formula

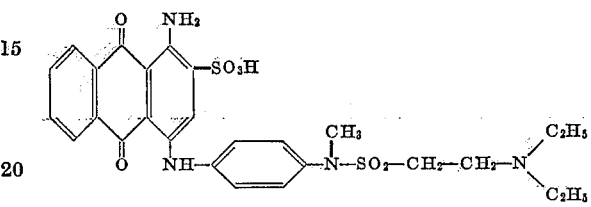

References Cited

UNITED STATES PATENTS

| | | | |
|---|---|---|---|
| 2,277,628 | 3/1942 | Bradbrook et al. | 260—314 |
| 2,863,875 | 12/1958 | Bienert et al. | 260—314.5 |
| 3,210,345 | 10/1965 | Gamlen et al. | 260—242 |

OTHER REFERENCES

Wagner et al.: Synthetic Organic Chemistry, Wiley, New York, N.Y. (1953), pages 659, 660, 666–668, 672 and 673.

JOHN D. RANDOLPH, *Primary Examiner.*

J. A. PATTEN, W. A. MODANCE,
*Assistant Examiners.*